United States Patent Office 3,420,046
Patented Jan. 7, 1969

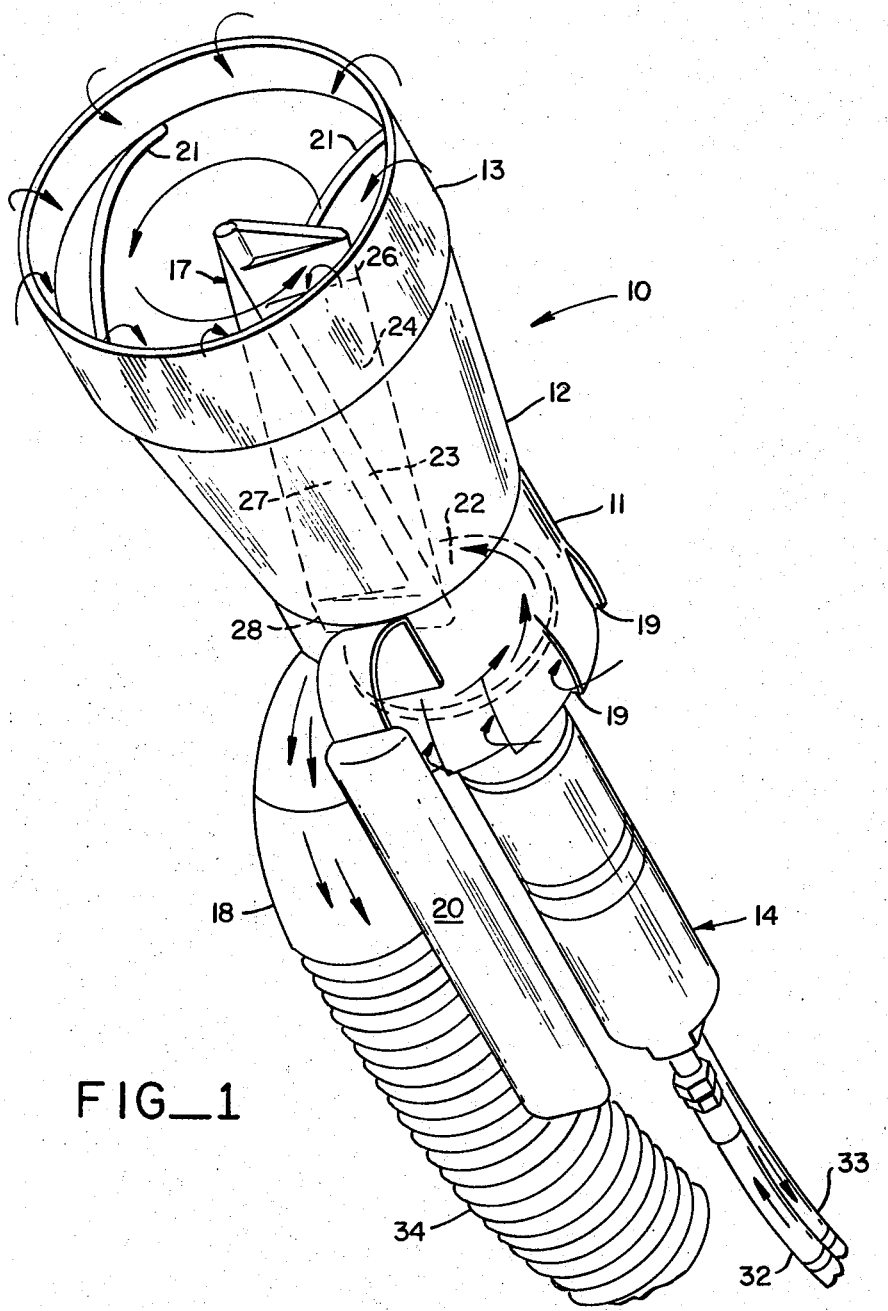
FIG_1

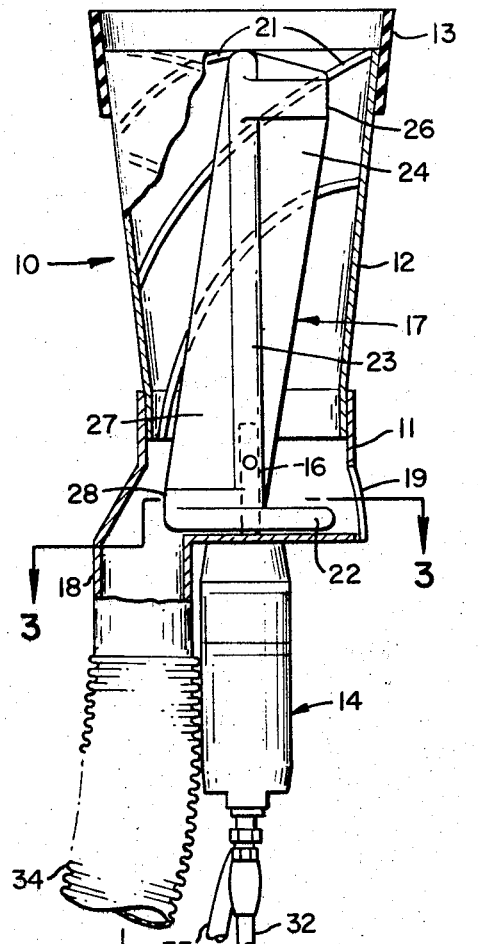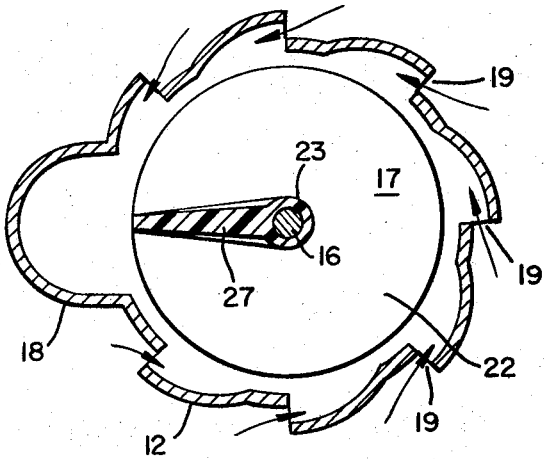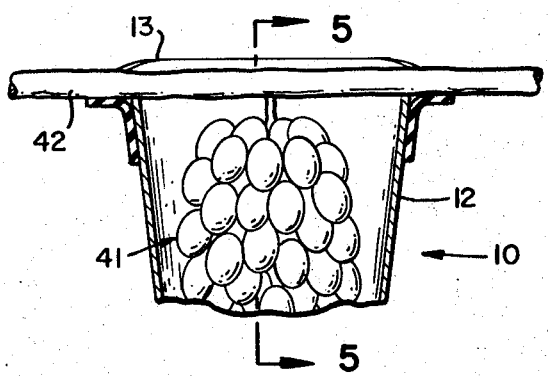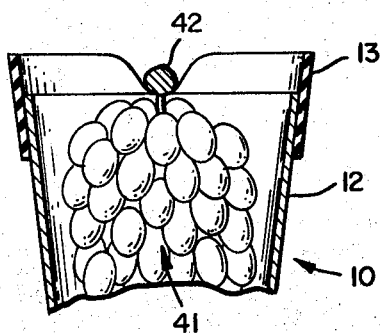

3,420,046
PNEUMATIC NOZZLE ASSEMBLY FOR HARVESTING GRAPES AND BERRIES
Wallace J. S. Johnson and Robert E. Fisher, Berkeley, and Gerald L. Claxton, Albany, Calif., assignors to Up-Right, Inc., Berkeley, Calif., a corporation of California
Filed Sept. 20, 1966, Ser. No. 580,820
U.S. Cl. 56—330          9 Claims
Int. Cl. A01g 19/08

This invention relates to picking of grapes, cherries, berries and other fruit for juice or wine purposes.

Work has been carried on for some time in the development of pneumatic grape-pickers, and reference is made to the U.S. Patent No. 3,233,396 issued to Joseph E. Gallo on Feb. 8, 1966, as a disclosure of a method and apparatus developed by the E. & J. Gallo Winery for harvesting grapes, which has been under development since 1961. In the Gallo patent, the fruit-picking nozzle 44 is a simple tube which is moved towards the grapes and through which a suction of air pneumatically picks grape berries from the vine. In actual operation by the Gallo Winery, the suction tube has been found by them to be very successful in removing the grapes from the vines. However, the same suction that pulls the grapes from the vines also sucks in a large amount of leaves and stems of the plant. The inrushing air literally destroys the green portions of the leaves by pulling them off in minute green patches, leaving behind the petiole and the veinal framework of the leaves on the cane. The ruptured cells release their chlorophyll, making the must (the crushed grape berries in the semi-liquid form prior to fermentation) unacceptable for winemaking.

This condition was realized in 1962, and every idea broached by the Gallo Winery to prevent the admission of leaves to the nozzle was tried without success. Additionally, many efforts were attempted to build a separator which would be effective to separate the sucked-in leaves and grapes. One separator was constructed that gave a satisfactory separation of fruit and leaves, but this was successful at only one period during the harvest of a variety with a firm pulp and resistance of juicing. When this separator was tried on other wine varieties, those which burst and juiced easily, it did not perform satisfactorily.

During the 1964 season, defoliants were used in an attempt to save the leaves beyond the bunches. All known defoliants were tested, plus fertilizers having a defoliant action. A butane flame-thrower was tried to sear the petioles and leaves. Again, none of these attempts were successful.

The 1965 grape season came and passed with no satisfactory solution to the separation of the leaves from the grapes.

During these past five years, the remainder of the Gallo pneumatic grape harvester has been developed and refined to a point where all that is necessary to make it a complete success is a satisfactory method of separating the leaves from the grapes.

Another problem with the Gallo pneumatic grape harvester is that enormous suction pressure is necessary to pick and convey the bunches of grapes. When the berries impinge on the vane in the vacuum tank to be macerated, they release a portion of their juice as vapor which is exhausted to the atmosphere. This waste of valuable juice is avoided in the present invention because the pneumatic suction required to pick and convey individual berries, by the method herein described, is very small, and there is very little vacuum (less than one inch of mercury) in the storage tank.

There have also been attempts to devise a successful mechanical grape picker. One of these requires the grape bunches to be trained to hang below a trellis. When ripe, the bunches are cut from the vine by a sickle-bar mowing device. The bunches drop onto a moving belt which delivers them into a hopper, from which they are dumped into a truck. In turn, the bunches are crushed at the winery to remove the stems and macerate the berries.

Another device shakes the bunches from the vines by vibration. A conveyor delivers the bunches to a hopper. They are conveyed to the winery by truck. There the bunches are put through a crusher to remove the stems and to macerate the berries. Subsequent operations involve the manufacture of wine or unfermented juice from the "must," i.e., these macerated berries.

In none of these mechanical picking devices has there been any attempt to pick the individual berries rather than the bunches. In these mechanical picking methods, as well as in hand picking, a relatively large number of leaves and other parts of the vine are mixed with the bunches of berries. Very little of this leaf matter is removed by the crusher. It is therefore a contaminant to the flavor and the quality of the wine or juice.

The principal object of the present invention is to provide a method and an apparatus for the picking of individual grapes and other fruit berries, without simultaneously picking or crushing stems, leaves or other contaminants.

Still another object of the invention is to provide a picking nozzle which will be completely safe for the user—free from knives, cutters, or the violent force of strong pneumatic suction.

In general, the objects of the invention are accomplished by the use of a nozzle which has a tubular member rimmed with resilient material (e.g., rubber) and within which is disposed a rotating paddle of resilient material (e.g., rubber). Air is sucked through the tubular member gently to convey the individual berries through the nozzle. This gentle intake of air into the end of the nozzle is not sufficient to suck leaves into the nozzle. A greater volume of air, but still at less than one inch of mercury suction presure, is sucked through louvers in the base of the nozzle to augment the swirling action of the picked berries as they are separated from the stems and pneumatically conveyed from the nozzle through a hose to a storage tank. If the nozzle is manipulated by the user so that the bunch of grapes or berries is surrounded by the tubular member, the rotating paddle beats the berries off the stem. However, the rotational speed is not so great (less than 3000 r.p.m.) as to break off any appreciable quantity of stems or leaves. The design and resiliency of the paddle avoids any cutting of leaves, stems or seeds that would contaminate the "must" (i.e., crushed berries) with chlorophyll, tannin, or other substances harmful to flavor or quality of the final product. But the action of the paddle in beating the ripe berries off the stem picks the individual berries as they are conveyed by air through the nozzle.

Other objects and advantages will become apparent in the course of the following detailed description.

In the drawings, which form a part of this application,
FIG. 1 is a perspective view of a picking nozzle constructed in accordance with the present invention.
FIG. 2 is a view, partly in section, of the picking nozzle of FIG. 1, and a schematic illustration of the system in which the nozzle is used.
FIG. 3 is a sectional view of the picking nozzle, taken on lines 3—3 of FIG. 2.
FIG. 4 is a partial sectional view of the picking nozzle, with the impeller paddle removed for purposes of clarity, to illustrate the manner in which an entire bunch of grapes may be moved into the nozzle.
FIG. 5 is a sectional view taken on line 5—5 of FIG. 4.
Referring now to the drawings, the picking nozzle 10 illustrated in FIGS. 1–5 comprises a cylindrical base housing member 11 to which is secured a tapered tubular housing extension 12. A flexible rubber sleeve 13 is affixed, by conventional means, to the end of the housing extension and projects therefrom. A conventional pneumatic motor 14, fastened to the base member 11, has a spindle 16 on which is mounted an impeller paddle 17. The base member 11 is provided with a tubular skirt 18 which is offset from the axis of the base member and opens peripherally into the interior of the base member. The base member is also provided with a plurality of louver openings 19 therearound for the admission of air into the base member. A handle 20 is secured to the base member for manipulation of the picking nozzle by a workman. The housing extension 12 is provided with a plurality of inwardly projecting guide vanes 21 which spiral downwardly from the open end of the housing extension.

The open end of the extension member 12 is sized in accordance with the fruit to be picked. For grape-picking, the open end of the extension member will be in the order of from four to six inches in diameter, so that it will be approximately the diameter of the grape bunches to be picked. The resilient sleeve 13 projects about an inch from the end of the extension member, and the guide vanes 21 are approximately one-quarter inch in width and project approximately one-quarter inch inwardly toward the axis of the extension member.

The impeller paddle 17, which is preferably molded as an integral member from a resilient material such as rubber, has a circular base 22 and an upstanding shaft portion 23. An upper tapered paddle blade 24 extends outwardly from the shaft portion and has its widest portion 26 adjacent the open end of the extension member 12. The edge of the widest portion of the blade 24 is preferably spaced from the housing extension a distance approximately equal to the diameter of a grape to be picked. If the spacing is less, then the grapes will tend to wedge between the blade 24 and the housing extension and thus increase the amount of the torque required to drive the impeller paddle at its desired speed. If the spacing is greater, then there will be a tendency for the grapes to move against the housing extension so that the paddle cannot strike the grapes to remove them from their stems. Preferably, only a single upper paddle blade 24 is used so that more room is provided for entry of a grape bunch into the picking nozzle. The impeller paddle is also provided with a lower tapered paddle blade 27, on the side opposite to blade 24, which has its widened portion adjacent the impeller paddle base 22.

As shown on the drawings, the impeller paddle extends upwardly in the housing extension, with the top of the impeller shaft 23 being situated generally at the level of the open end of the housing extension 12.

The picking nozzle 10 is designed for use in a pneumatic harvesting system as shown in FIG. 2. An air compressor 31 delivers high-pressure air though flexible conduit 32 to the pneumatic motor 14, and such air then exhausts to atmosphere through flexible conduit 33. The pneumatic motor rotates the impeller paddle in the order of 3000 r.p.m. or less. The speed is selected so that the impeller paddle will rotate with enough force to knock the grapes from their stems but not with such force that it will also break off any appreciable quantity of stems or leaves. The pneumatic motor 14 rotates the impeller blade in a counterclockwise direction as viewed from the open end of the picking nozzle, and the guide vanes also descend in a counterclockwise direction in the housing extension 12.

A flexible conveying hose 34, designed for relatively low-pressure use, is attached to the skirt 18 and extends to a centrifugal separator 36, wherein the grape must and conveying air are separated. The air is discharged from the separator 36 by blower 37, which preferably blows such air at the compressor 31 to cool the latter. The separated must is pumped by pump 38 to a suitable storage tank.

In a system which has been in operation, the hose 34 is approximately two and a half inches in diameter, and seven feet long. It is desired to have a flow of air through this hose in the order of 140–300 cubic feet per minute, which requires a low pressure in the separator 36 of about one inch of mercury.

In operation, the workman manipulates the nozzle 10 so that it comes up under a bunch of grapes and the bunch is fed into the open end of the housing extension. The flexible impeller blade 24 hits the grapes so as to knock them from their stems and the guide vanes direct the grapes to the bottom of the base member 12. The low pressure in the conveying hose 34 will suck some air in through the open end of the nozzle to aid in moving the picked grapes toward the base member. The rubber sleeve 13 which extends from the housing extension, in conjunction with the grapes in the bunch which are not yet picked, will prevent grapes from being ejected from the nozzle as the impeller paddle beats the grapes free from their stems.

The rotation of the lower paddle blade 27 urges the picked grapes outwardly of the base member so that they are ejected into the skirt 18 to be conveyed to the separator 36. At the same time, the low pressure in hose 34 causes air to be sucked into the base member through louvers 19 and the rotation of the lower paddle blade 27 causes such air to swirl around in the base member to assist in removing the grapes to hose 34. A greater volume of air comes into the nozzle through the louvers 19 than through the open end of the housing extension.

The flexible sleeve 13 enables all of the grapes in a bunch to be picked, as is shown in FIGS. 4 and 5. Typically, a bunch of grapes 41 will grow and hang down from a horizontal cane 42, and it is necesary to move the impeller paddle up almost to the cane in order to remove all of the grapes in the bunch. The sleeve 13 allows this to be done by deforming where it engages the cane 14 so that the rigid housing extension 12 and impeller paddle can move up to the cane to knock the last grapes free. The remainder of the sleeve 13 will be undeformed and thus will project upwardly around both sides of the cane so that these grapes will not be flung from the picking nozzle as they are removed from their stems.

It is to be understood that the form of the invention herein shown and described is a preferred embodiment of the same and that various changes may be made in the shape, size and arrangement of parts without departing from the spirit of the invention or the scope of the attached claims.

For example, although a pneumatic motor 14 has been shown, it would be possible to use an electric motor mounted on the base member 12, or a remote motor driving the impeller paddle by means of a flexible transmission shaft could be used. In the case that the impeller paddle is driven by a flexible shaft, the flexible shaft can be on the axis of the hose 34, the impeller paddle 17 need have no base 22, and the picked fruit can be directly and axially sucked through housing 12 and hose 34.

Also, the impeller paddle could be operated in a clockwise direction, and the guide vanes could spiral in the correspondingly opposite direction.

As an alternative, it has been found, in a system which has been in operation, that the picked fruit can be conveyed through the hose 34 without the use of a blower 37. In such case, the rotation of the impeller paddle 17 functions as a blower itself to fill the hose 34 with picked fruit. A suitable pump in the hose line, or pump 38, can then pump the semi-liquid fruit to the storage tank, and air separator 36 would not be required.

Further, whereas the description of operation above refers to the picking of grapes, it is to be realized that the same principles are applicable to other fruits such as cherries and berries from which juice or wine is to be made.

Having thus described our invention, we claim:
1. In an apparatus for harvesting fruit:
   (a) a tubular member having an open end,
   (b) a paddle disposed in said tubular member,
   (c) means for rotating said paddle axially of said tubular member,
   (d) said paddle having a blade portion extending radially towards said tubular member, said blade portion being disposed adjacent said open end of said tubular member,
   (e) a flexible conveying hose,
   (f) means connecting said hose to the interior of said tubular member opposite to the open end thereof.
2. In a fruit-harvesting apparatus as set forth in claim 1, and wherein said blade portion (d) is formed of a resilient material.
3. In a fruit-harvesting apparatus as set forth in claim 1, and further including:
   (g) a resilient sleeve secured to the open end of said tubular member and extending therefrom.
4. In a fruit-harvesting apparatus as set forth in claim 3,
   (h) wherein the outermost edge of said blade portion is spaced from the tubular member a distance approximately equal to the diameter of the fruit to be harvested by said apparatus, and further including
   (i) a plurality of guide vanes extending inwardly of said tubular member and spiraling therealong from the open end thereof in the direction of rotation of said paddle.
5. In a fruit-harvesting apparatus as set forth in claim 4, wherein said blade portion (d) is formed of a resilient material.
6. In a fruit-harvesting apparatus as set forth in claim 4,
   (j) wherein said means (f) connects said hose to the periphery of said tubular member,
   (k) said paddle having a second radially extending blade portion disposed adjacent to the connection from said hose to the periphery of said tubular member,
   (l) means for supplying a suction to said hose,
   (m) said tubular member having a plurality of louver openings therearound spaced from the open end of said tubular member.
7. In a fruit-harvesting apparatus as set forth in claim 1,
   (g) wherein the outermost edge of said blade portion is spaced from the tubular member a distance approximately equal to the diameter of the fruit to be harvested by said apparatus, and further including
   (h) a plurality of guide vanes extending inwardly of said tubular member and spiraling therealong from the open end thereof in the direction of rotation of said paddle.
8. In a fruit-harvesting apparatus as set forth in claim 1,
   (g) wherein said means (f) connects said hose to the periphery of said tubular member,
   (h) said paddle having a second radially extending blade portion disposed adjacent to the connection from said hose to the periphery of said tubular member.
9. In a fruit-harvesting apparatus as set forth in claim 8, and further including:
   (i) means for supplying a suction to said hose,
   (k) said tubular member having a plurality of louver openings therearound spaced from the open end of said tubular member.

References Cited

UNITED STATES PATENTS

| | | | |
|---|---|---|---|
| 787,314 | 4/1905 | Summerfield | 56—32 |
| 2,499,693 | 3/1950 | Stanton | 56—32 |
| 2,535,542 | 12/1950 | Lehman et al. | 56—328 |
| 3,138,912 | 6/1964 | Mays et al. | 56—328 |

RUSSELL R. KINSEY, *Primary Examiner.*

U.S. Cl. X.R.

56—32; 302—45